US007242438B2

(12) United States Patent
Song

(10) Patent No.: US 7,242,438 B2
(45) Date of Patent: Jul. 10, 2007

(54) IMAGE DISPLAYER WITH FACILITATED CHANNEL SETTING PROCESS

(75) Inventor: Hyun-chul Song, Suwon (KR)

(73) Assignee: Samsung Electronics Co., Ltd., Suwon, Gyunggi-do (KR)

( * ) Notice: Subject to any disclaimer, the term of this patent is extended or adjusted under 35 U.S.C. 154(b) by 499 days.

(21) Appl. No.: 10/674,510

(22) Filed: Oct. 1, 2003

(65) Prior Publication Data

US 2004/0061807 A1    Apr. 1, 2004

(30) Foreign Application Priority Data

Oct. 1, 2002    (KR)    ................... 10-2002-0059884

(51) Int. Cl.
*H04N 5/445*    (2006.01)

(52) U.S. Cl. .................. 348/569; 348/563; 348/567; 348/570; 715/810

(58) Field of Classification Search ............... 348/569, 348/570, 563, 567, 731, 732, 564, 739; 725/38, 725/40, 50, 5.5, 57; 715/810, 764
See application file for complete search history.

(56) References Cited

U.S. PATENT DOCUMENTS

| | | | | |
|---|---|---|---|---|
| 5,253,066 A * | 10/1993 | Vogel | ................... | 725/28 |
| 5,428,405 A * | 6/1995 | Lee | .................. | 348/731 |
| 5,564,073 A * | 10/1996 | Takahisa | ................. | 455/3.06 |
| 5,625,422 A * | 4/1997 | Kim | .................. | 725/57 |
| 5,652,613 A * | 7/1997 | Lazarus et al. | ............... | 725/50 |
| 5,917,481 A * | 6/1999 | Rzeszewski et al. | ........ | 715/721 |
| 5,999,228 A * | 12/1999 | Matsuura et al. | ........... | 348/569 |
| 6,049,333 A * | 4/2000 | LaJoie et al. | ................. | 715/718 |
| 6,209,131 B1 * | 3/2001 | Kim et al. | .................. | 725/50 |
| 6,525,779 B1 * | 2/2003 | Sakakibara et al. | ......... | 348/558 |
| 6,535,229 B1 * | 3/2003 | Kraft | ................. | 715/764 |
| 6,536,041 B1 * | 3/2003 | Knudson et al. | ............... | 725/39 |
| 6,700,624 B2 * | 3/2004 | Yun | .......................... | 348/555 |
| 6,708,336 B1 * | 3/2004 | Bruette | ..................... | 725/57 |
| 6,741,288 B1 * | 5/2004 | Kessler | .................. | 348/385.1 |
| 6,785,903 B1 * | 8/2004 | Kuh | .......................... | 725/50 |
| 6,807,677 B1 * | 10/2004 | Lee | ............................. | 725/58 |
| 6,817,027 B1 * | 11/2004 | Curreri | ...................... | 725/28 |
| 6,888,576 B2 * | 5/2005 | Takagi et al. | ............... | 348/569 |
| 6,928,653 B1 * | 8/2005 | Ellis et al. | .................. | 725/50 |
| 6,951,031 B2 * | 9/2005 | Hatano | ........................ | 725/50 |
| 6,968,566 B1 * | 11/2005 | Entwistle | .................... | 725/39 |

FOREIGN PATENT DOCUMENTS

| | | |
|---|---|---|
| CN | 1164777 A | 11/1997 |
| CN | 1358025 A | 7/2002 |
| JP | 10-285479 A | 10/1998 |
| JP | 2000-165769 A | 6/2000 |

* cited by examiner

*Primary Examiner*—David Ometz
*Assistant Examiner*—Jean W. Désir
(74) *Attorney, Agent, or Firm*—Sughrue Mion, PLLC

(57) ABSTRACT

An image displayer with a facilitated channel setting process, in which the channels are set based on a pre-stored channel information. The image displayer includes a channel information storing unit for storing the channel information, an OSD (On Screen Display) processing unit for displaying an OSD menu which is configured based on the channel information stored in the channel information storing unit, and a controlling unit for looking up menu items displayed in the OSD menu and updating the channel information stored in the channel information storing unit based on a changed channel information. According to the image displayer, since the channel setting based on the ATM (Auto Tuning Management) table is completed by simply selecting desired broadcasting channels in the OSD menu, the process of setting the channels can be simplified.

7 Claims, 6 Drawing Sheets

FIG. 2
(PRIOR ART)

| COUNTRY | NO. | BROADCASTING STATION |
|---|---|---|
| Germany | 1 | ARD |
| | 2 | ZDF |
| | 3 | RTL |
| | 4 | SAT 1 |
| | 5 | PRO 7 |
| | 6 | KABEL |
| | 7 | RTL 2 |
| | 8 | VOX |
| | 9 | BR3 |
| | 10 | HR3 |
| | 11 | NDR 3 |
| | 12 | SW 3 |
| | 13 | WDR 3 |
| | 14 | MDR 3 |

•
•
•

IMAGE DISPLAYER WITH FACILITATED CHANNEL SETTING PROCESS

BACKGROUND OF THE INVENTION

1. Field of the Invention

The present invention relates to an image displayer, and more particularly, to an image displayer with a facilitated channel setting process and a method thereof. The present application is based on Korean Patent Application No. 2002-59884, which is incorporated herein by reference.

2. Description of the Prior Art

Generally, as the number of channels for the reception of an image displayer such as a television set grows, it becomes more complicated for a viewer to input and record the channel numbers. This problem can be partially solved by performing an auto scanning with respect to receivable frequency bands and storing detected channels, and the viewer can easily detect and store the channels. Meanwhile, some of the European countries using a PAL (Phase Alternation by Line) method have adopted an ATM (Auto Tuning Management) method, which is to store information on receivable broadcasting channels in an image displayer and allow viewers to select some parts of the stored information.

FIG. 1A is a view showing an on-screen-display (OSD) menu to illustrate a conventional auto scanning.

As shown in FIG. 1, the OSD menu, which is displayed on a screen 12 in response to a menu key 11 attached on an image displayer 10, has sub-menus 21 to 24 including a channel menu 21, an image quality menu 22, a sound menu 23, and other menus (24). Upon selecting the channel menu 21 in the sub-menus 21 to 24 by pressing channel up-down keys 31a, 31b and then pressing a direction setting key 32b, the image displayer 10 scans all receivable channels as shown in FIG. 1B. For example, if there are receivable channels from 1 to 100, the image displayer searches for normally receivable channels by scanning the channels in order and stores the channels in an extra memory (not shown). The stored channels are called for in the storing order when a viewer switches the channels by pressing the channel up-down keys 31a, 31b. According to this channel scanning method, because channel information stored in the memory (not shown) is sequentially called for in the storing order regardless of whether the viewer wishes it or not, the viewer has to press the channel up-down keys 31a, 31b until the channel he/she wishes is displayed.

FIG. 2 shows an example of an ATM table.

The ATM table as shown in FIG. 2 lists broadcasting channels of Germany in numerical order. In case that such an ATM table is displayed in the OSD menu, a viewer does not have to perform the auto scanning to search for the receivable channels. For example, the channel switches in the numerical order as shown in the ATM table as the viewer presses channel up-down keys. FIG. 3 shows a display shown when an ATM menu 40 is selected from an OSD menu displayed on a screen 60 of an image displayer. Referring to FIG. 3, a method of setting channels by using the ATM table of FIG. 2 will be described.

The ATM menu 40 has a country setting menu 41 and a channel setting menu 42. The country setting menu 41 allows a viewer to select an ATM table of a certain country. If the viewer selects the country "Germany" through the country setting menu 41, the viewer selects and edits channels based on the ATM table as shown in FIG. 2. For example, by pressing channel up-down keys 51a, 51b with a cursor being located in the channel setting menu 42, the viewer can set broadcasting channels (e.g. ARD to MDR 3) and their corresponding channel numbers (e.g. 01 to 99). However, this channel setting method is somewhat complicated for the viewer, because, according to the ATM menu, the viewer has to see all the broadcasting channels (ADR~MDR 3) displayed sequentially in the channel setting menu 42 with the pressing on the channel up-down keys 51a, 51b, select desired channels each time through a selection key 53, and then record/delete the selected channels. That is, compared to the auto scanning method as explained above through FIGS. 1A and 1B, the channel setting using the ATM table has an advantage in that the time for scanning the channels is decreased, but also has the disadvantage in that the viewer has to see all the broadcasting channels sequentially displayed in the OSD menu to select and record/delete the channels.

SUMMARY OF THE INVENTION

The present invention has been developed in order to solve the above problems in the prior art. Accordingly, an aspect of the present invention is to provide an image displayer and a channel setting method thereof which allow a viewer to set a channel with ease.

The above aspect is achieved by providing an image displayer with a facilitated channel setting process, in which the channels are set based on pre-stored channel information. The image displayer comprises a channel information storing unit for storing the channel information, an OSD (On Screen Display) processing unit for displaying an OSD menu which is configured based on the channel information stored in the channel information storing unit, and a controlling unit for looking up menu items displayed in the OSD menu and updating the channel information stored in the channel information storing unit based on a changed channel information.

Preferably, the OSD menu displayed by the OSD unit comprises a broadcasting channel menu for displaying broadcasting channels corresponding to the channel information, and a check box menu for selecting/un-selecting the broadcasting channels displayed in the broadcasting channel menu.

Preferably, the OSD menu further comprises a frequency menu for displaying frequencies corresponding to the broadcasting channels.

Preferably, the OSD menu further comprises a channel number menu for displaying channel numbers corresponding to the broadcasting channels.

Preferably, the channel number menu changes the broadcasting channel number displayed in the OSD menu to a predetermined number.

Preferably, the broadcasting channels are transmitted in a PAL (Phase Alternation by Line) method.

Preferably, the channel information is a channel based on an ATM (Auto Turning Management) table and its related information.

The above aspect is achieved by providing a channel setting method of an image displayer, in which channels are set based on a pre-stored channel information. The channel setting method comprises the steps of displaying an OSD menu configured based on the pre-stored channel information, and looking up menu items displayed in the OSD menu and updating the pre-stored channel information based on a changed channel information.

Preferably, the OSD menu comprises a broadcasting channel menu for displaying broadcasting channels corresponding to the channel information, and a check box menu for selecting/un-selecting the broadcasting channels as displayed and releasing the selection.

Preferably, the OSD menu further comprises a frequency menu for displaying frequencies corresponding to the broadcasting channels.

Preferably, the OSD menu further comprises a channel number menu for displaying channel numbers corresponding to the broadcasting channels.

BRIEF DESCRIPTION OF THE DRAWINGS

The above aspect and other features of the present invention become more apparent by describing a preferred embodiment of the present invention in greater detail with reference to the accompanying drawings, in which:

FIG. 2 is a view showing an example of an ATM table;

DESCRIPTION OF THE PREFERRED EMBODIMENT

Figure 1A:
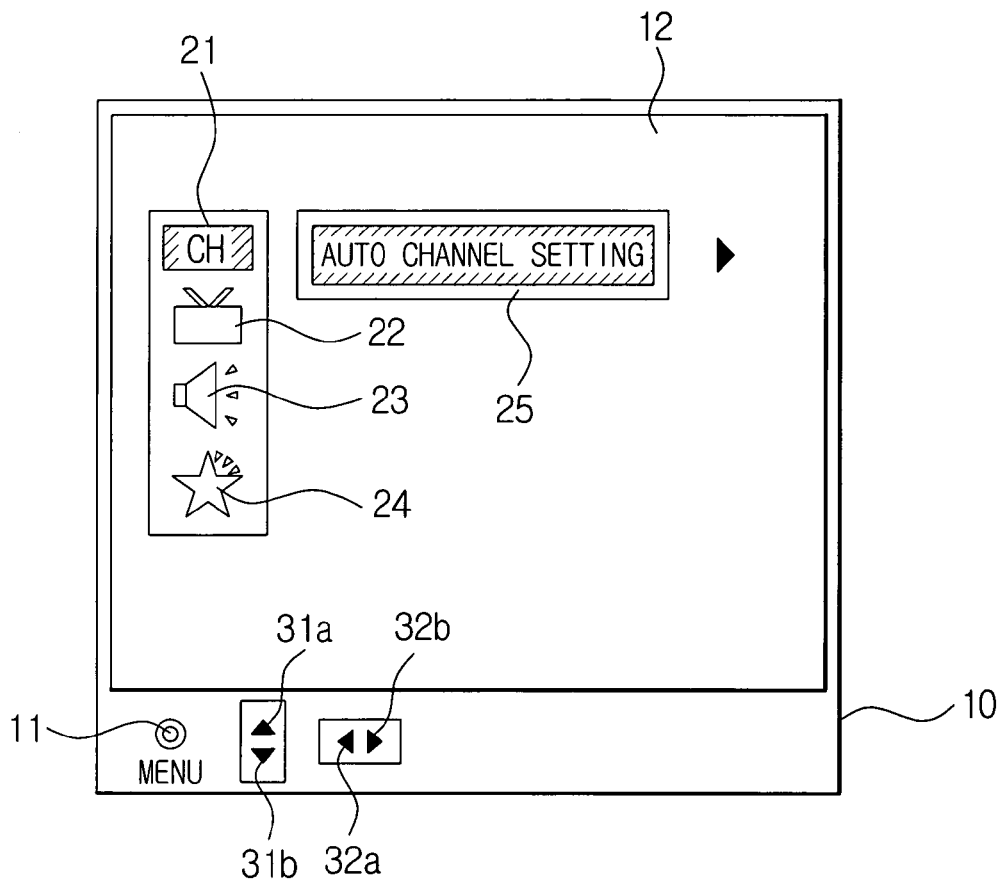
FIGS. 1A and 1B are views showing an OSD menu to explain a conventional auto scanning method.
Figure 1B:
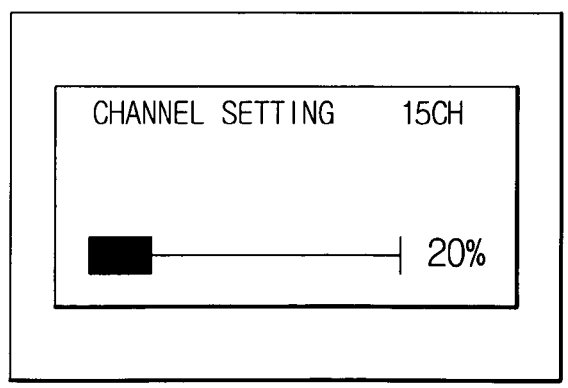
Figure 3:
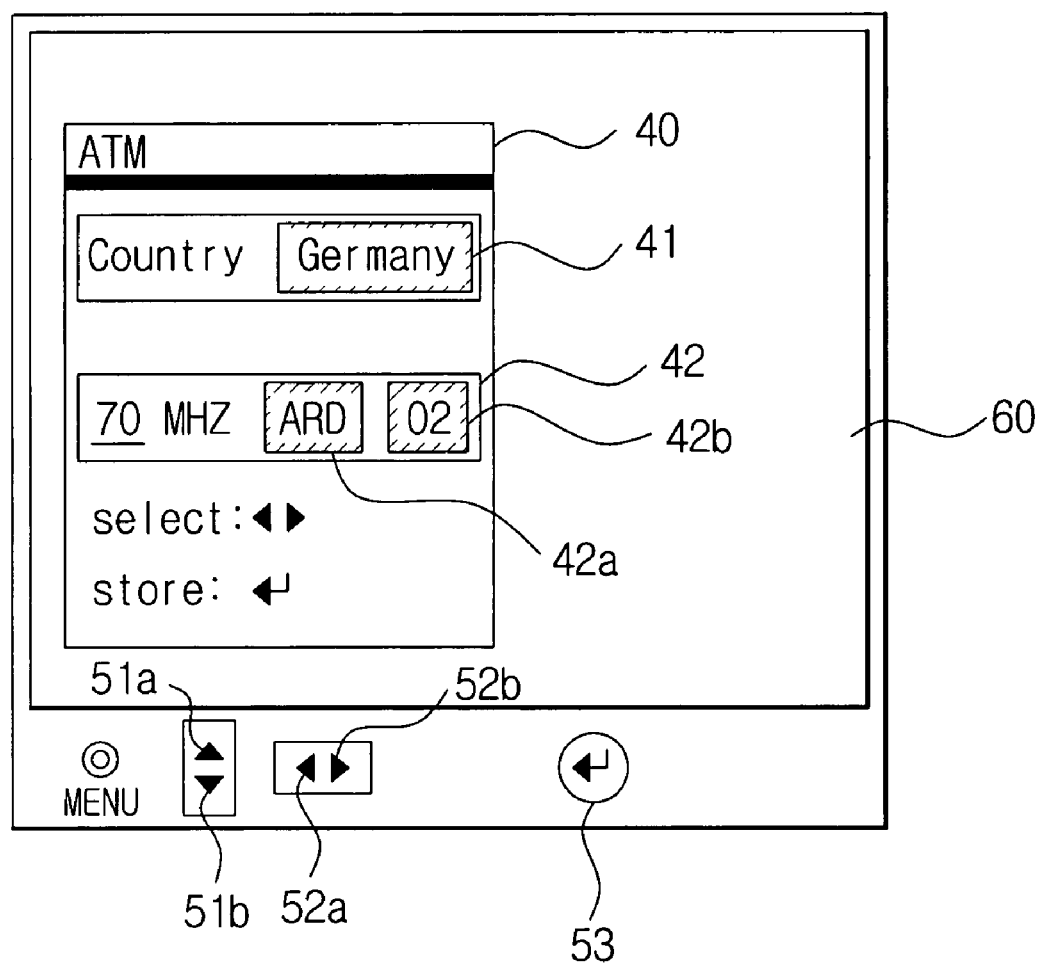
FIG. 3 is a view illustrating a channel setting method using the ATM table of FIG. 2.
Figure 4:
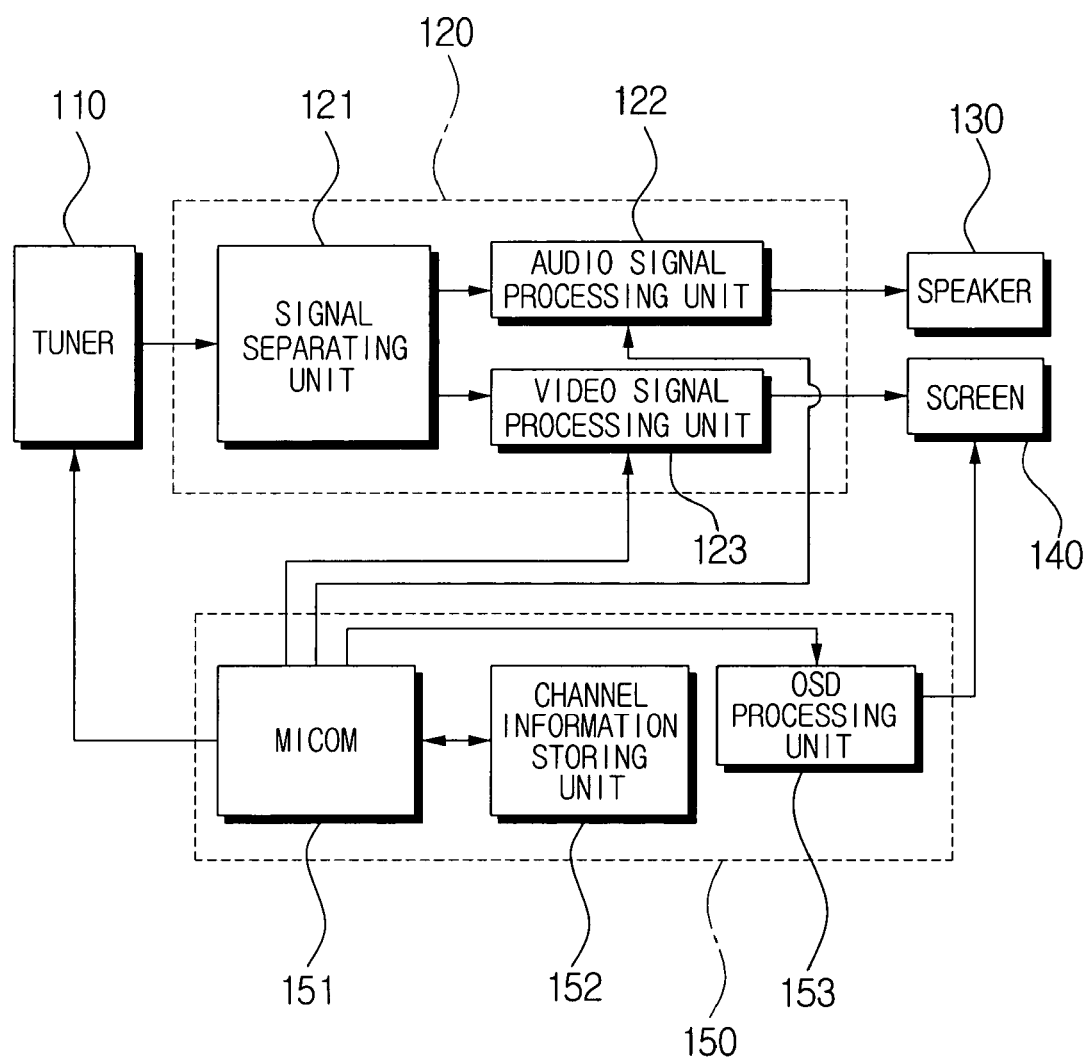
FIG. 4 is a block diagram showing an image displayer according to a preferred embodiment of the present invention.

FIG. 4 is a block diagram showing an image displayer according to a preferred embodiment of the present invention.

The image displayer as shown in FIG. 4 includes a tuner 110, a signal processing unit 120, a speaker 130, a screen 140, and a controlling unit 150.

The tuner 110 selects a predetermined broadcasting channel.

The signal processing unit 120 processes the broadcasting channel selected by the tuner 110, generates a video signal and an audio signal and transmits the signals to the speaker 130 and the screen 140.

The controlling unit 150 controls general operations of the image displayer. For example, the controlling unit 150 changes the broadcasting channel selected by the tuner 110, or controls the signal processing unit 120 to change audio and video characteristics in response to a control signal (not shown) generated by a setting key (not shown) which is attached on a remote controller (not shown) or the image displayer. Also, the controlling unit 150 re-configures channel information according to channel information that a viewer designates through an OSD menu and allows the viewer to tune the broadcasting channel according to the re-configured channel information.

Preferably, the signal processing unit 120 includes a signal separating unit 121, an audio signal processing unit 122, and an video signal processing unit 123.

The signal separating unit 121 separates a broadcasting signal supplied from the tuner 110 into a video signal and an audio signal.

The audio signal processing unit 122 processes the audio signal separated and inputted from the signal separating unit 121 and then outputs it to the speaker 130.

The video signal processing unit 123 processes the video signal separated and inputted from the signal separating unit 121 and then outputs it to the screen 130.

Preferably, the controlling unit 150 includes a micom 151, a channel information storing unit 152, and an OSD processing unit 153.

The micom 151 controls the tuner 110, the signal processing unit 120, and the OSD processing unit 153, in response to a control signal (not shown) generated by the setting key attached on the remote controller (not shown) or the image displayer. Also, when the viewer sets channels, the micom 151 controls the channel information storing unit 152 to update the channel information pre-stored in the channel information storing unit 152. The updating process of the channel information storing unit 152 will be described in detail later.

The channel information storing unit 152 stores an ATM (Auto Tuning Management) table and transmits the ATM table to the micom 151 for use in channel setting. For reference, the ATM table is only operated in the European countries using the PAL method.

The OSD processing unit 153 is controlled by the micom 151 to display text on the screen 140. The OSD processing unit 153 has a predetermined font stored for the text displayed on the screen 140, and is controlled by the micom 151 to display the predetermined font on the screen 140.

Figure 5A:
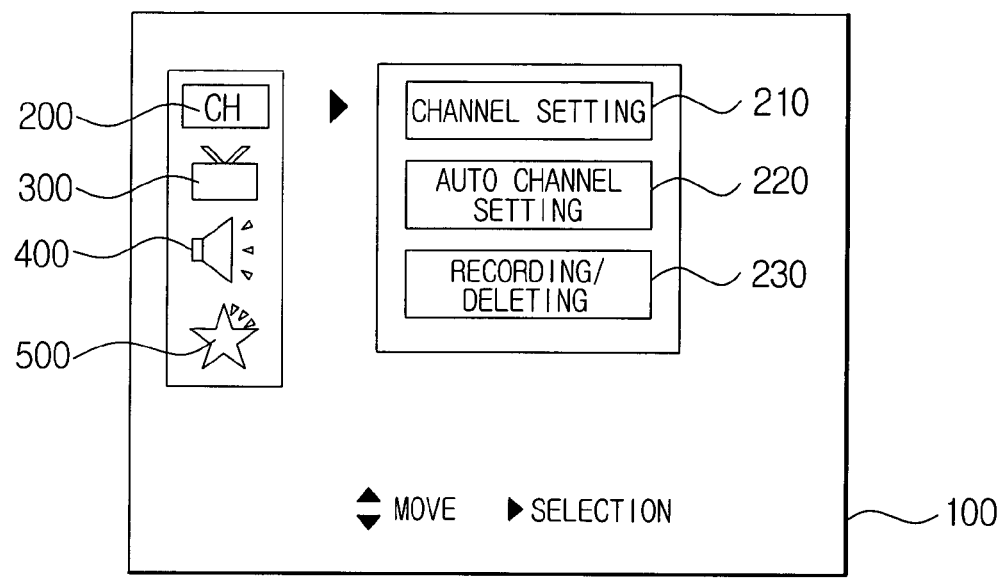
FIGS. 5A and 5B are views showing an OSD menu to explain a process of setting a channel of the image displayer according to the present invention.
Figure 5B:
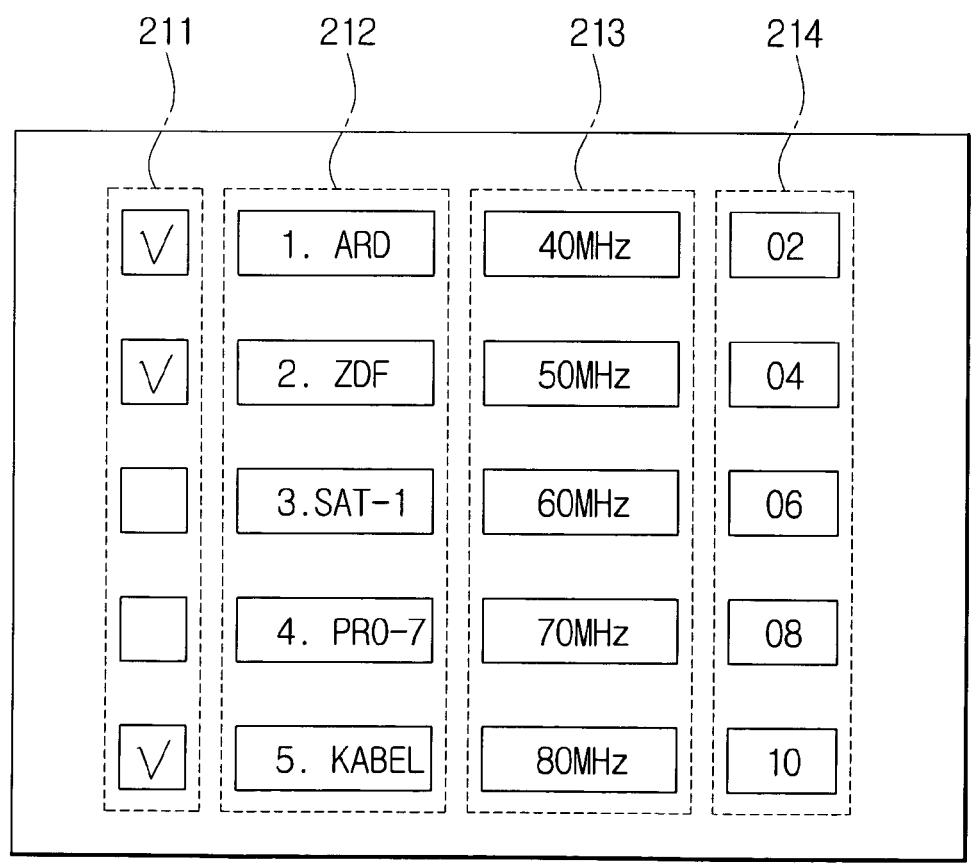

FIGS. 5A and 5B show OSD menus to illustrate a process of setting a channel of the image displayer according to the present invention.

The OSD menu includes a channel menu 200, an image quality menu 300, a sound menu 400, and other menus 500.

The channel menu 200 has sub-menus including a channel setting menu 210, an auto channel setting menu 220, and a channel recording/deleting menu 230. When a viewer selects the channel menu 200 and then the channel setting menu 210 by manipulating menu moving keys provided on a remote controller (not shown) or setting keys attached on the image displayer (not shown) in order to set a channel, the OSD menu is displayed on the screen 140 as shown in FIG. 5B. The channel setting menu 210 displayed on the screen 140 has a check box menu 211, a broadcasting channel menu 212, a frequency menu 213, and a channel number menu 214.

The broadcasting channel menu 212 displays all the broadcasting channels in the OSD according to the ATM table stored in the channel information storing unit 152. The broadcasting channels are displayed in the same order as the broadcasting channels were previously stored in the channel information storing unit 152, each name of which can be changed by a viewer. If all the broadcasting channels could not be displayed in one page of the screen due to the large number of broadcasting channels, the non-displayed broadcasting channels are scrolled down to the next page by manipulating the menu moving keys provided on the remote controller or the setting keys attached on the image displayer.

The check box menu 211 is to select the broadcasting channels displayed in the broadcasting channel menu 212 or undo the selection. In the OSD menu as shown in FIG. 5B, there are selected a broadcasting channel "ARD" having a channel number 02, a broadcasting channel "ZDF" having a channel number 04, and a broadcasting channel "KABEL" having a channel number 10. The selections of the broadcasting channels are made by manipulating set keys provided on the remote controller (not shown) and the image displayer. For example, one or two keys of the keys provided on the remote controller are set as a key to select a broadcasting channel through the check box menu 211 and undo the selection. Also, the remote controller is provided with an extra key for selecting the broadcasting channel through the check box menu 211 and undoing the selection. Here, in the case of setting one key to select the broadcasting channel and undo the selection, the micom 151 is programmed so that pressing the key once selects the broadcast channel and pressing the key twice undoes the selection. In the case of setting two keys, one key selects the broadcasting channel and the other key undoes the selection. The broadcasting channels selected through the check box menu 211 are stored in the channel information storing unit 152 by the micom 151. With reference to the stored broadcasting channels, the image displayer switches the channels by manipulating the remote controller or the setting key.

The frequency menu 213 is positioned on the right-hand side of the broadcasting channel menu 212 and displays a transmission frequency of each broadcasting station as displayed.

The channel number menu 214 displays a channel number corresponding to each broadcasting channel. The channel number is generally displayed on the right-hand or the left-hand side of the screen 140 when a viewer switches the channels, and it can be changed to a predetermined number as the viewer wishes.

Meanwhile, the micom 151 updates the channel information stored in the channel information storing unit 152 in response to the selection of the broadcasting station made by the check box menu 211. Likewise, the micom 151 updates the channel information when the selection of the broadcasting station is undone. Accordingly, when the viewer switches the channel of the image displayer using the remote controller or the setting keys, the channel switching operation is performed only with respect to the channels that the viewer selected, based on the channel information stored in the channel information storing unit 152. Accordingly, by simply checking the check box menu 211 positioned on the left-hand side of the broadcasting display menu 212 through the remote controller or the setting keys, recording/deleting the channels is possible. Also, since the broadcasting channel menu 212 and their corresponding menus (e.g.; the check box menu 211, the channel number menu 214, and the frequency menu 213) are all displayed in one page of the screen, it becomes easy to set the channels or change the channel number.

Figure 6:
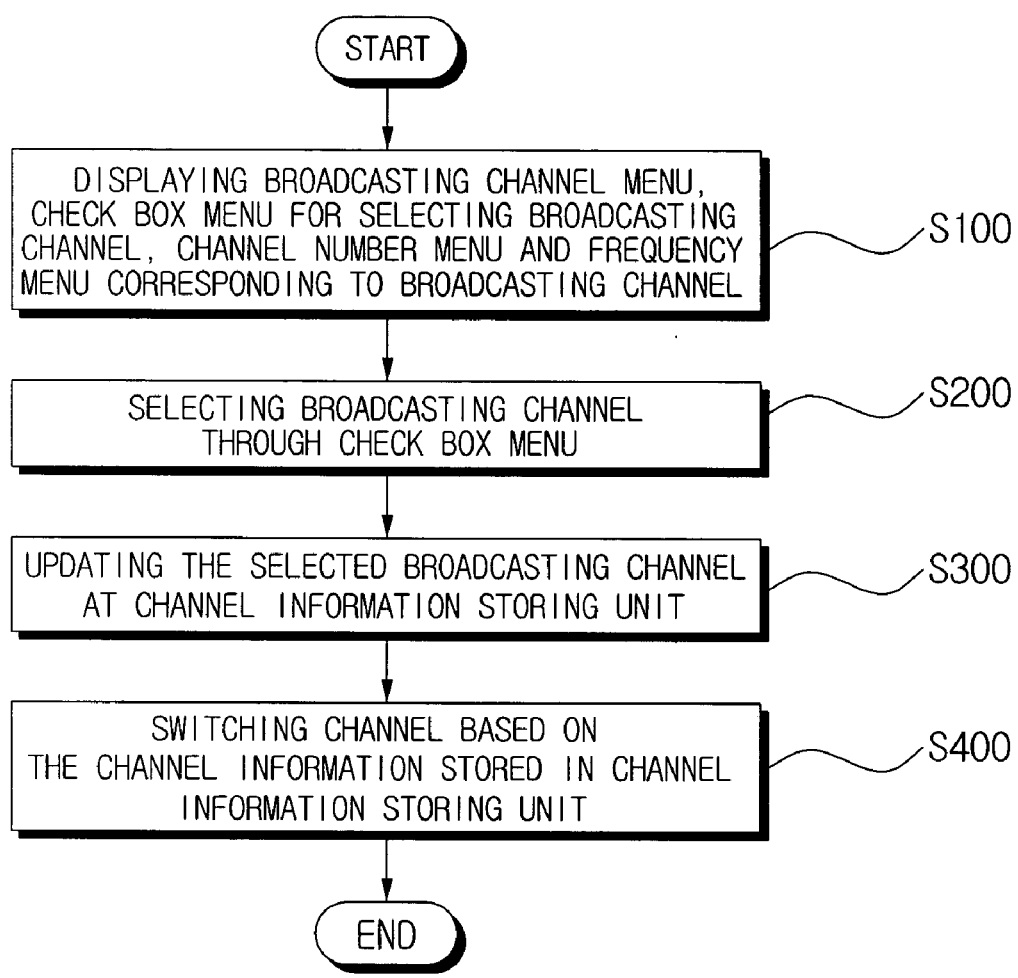
FIG. 6 is a flowchart showing a channel setting method of the image displayer according to the preferred embodiment of the present invention.

FIG. 6 is a flowchart showing a channel setting method of the image displayer according to the preferred embodiment of the present invention.

First, the OSD menu of the image displayer is displayed, which includes the broadcasting channel menu, the check box menu for selecting the broadcasting channels, the channel number menu and the frequency menu both corresponding to the broadcasting channels (S100). The broadcasting channel menu, the check box menu, the channel number menu, and the frequency menu are all displayed in one page. Next, a viewer selects broadcasting channels among the broadcasting channels displayed. In other words, the viewer selects his desired channels with reference to the broadcasting channels being displayed and their corresponding sub-menus e.g., the channel number menu and the frequency menu (S200). At this point, the channel setting, e.g., channel recording/channel deleting and channel information changing, is completed by simply checking the check box menu 211 positioned at the left-hand side of the broadcasting channel menu 212.

Accordingly, when the viewer wishes to have the channel recorded/deleted, he/she can set the channel without having to press the keys relating to the recording/deleting and confirm the recording/deleting. Also, the viewer can easily perceive the information on the channels that he/she selected since there are broadcasting channels and their corresponding information all displayed in the OSD. Next, the broadcasting channels selected through the check box menu 211 and their corresponding channel information (frequency information and channel number) are updated at the channel information storing unit 152 by the micom 151 (S300).

Accordingly, when the viewer switches the channel by manipulating the remote controller or the setting keys after setting the channel, the channel switching is made based on the broadcasting channels stored in the channel information storing unit 152 and their corresponding channel information (S400). Since all broadcasting channels are displayable in one screen, it is easy for the viewer to set the broadcasting channels.

As described above, the channel setting based on the ATM table is completed by simply selecting desired broadcasting channels in the OSD menu. Accordingly, the process of setting the channels can be simplified and less time is required.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An image displayer with a facilitated channel setting process, in which channels are set based on a pre-stored channel information, the image displayer comprising:
   a channel information storing unit for storing the pre-stored channel information;
   an OSD (On Screen Display) processing unit for displaying an OSD menu which is configured based on the pre-stored channel information stored in the channel information storing unit; and
   a controlling unit for looking up menu items displayed in the OSD menu and updating the pre-stored channel information stored in the channel information storing unit based on a changed channel information,
   wherein the OSD menu displayed by the OSD processing unit comprises:
   a broadcasting channel menu for displaying broadcasting channels corresponding to the pre-stored channel information; and
   a check box menu for selecting/un-selecting the broadcasting channels displayed in the broadcasting channel menu; and
   a frequency menu for displaying frequencies corresponding to the broadcasting channels.

2. The image displayer of claim 1, wherein the OSD menu further comprises a channel number menu for displaying channel numbers corresponding to the broadcasting channels.

3. The image displayer of claim 2, wherein the channel number menu changes the broadcasting channel number displayed in the OSD menu to a predetermined number.

4. The image displayer of claim 3, wherein the broadcasting channels are transmitted in a PAL (Phase Alternation by Line) format.

5. The image displayer of claim 4, wherein the channel information is a channel based on an ATM (Auto Tuning Management) table and its related information.

6. A channel setting method of an image displayer, in which channels are set based on a pre-stored channel information, the channel setting method comprising the steps of:
 displaying an OSD menu configured based on the pre-stored channel information; and
 looking up menu items displayed in the OSD menu and updating the pre-stored channel information based on a changed channel information,
 wherein the OSD menu comprises:
 a broadcasting channel menu for displaying broadcasting channels corresponding to the pre-stored channel information;
 a check box menu for selecting/un-selecting the broadcasting channels as displayed and releasing the selection; and
 a frequency menu for displaying frequencies corresponding to the broadcasting channels.

7. The channel setting method of claim 6, wherein the OSD menu further comprises a channel number menu for displaying channel numbers corresponding to the broadcasting channels.

* * * * *